United States Patent
Yoon et al.

(10) Patent No.: US 10,876,906 B2
(45) Date of Patent: Dec. 29, 2020

(54) MULTIAXIAL TACTILE SENSOR INCLUDING A PRESSURE SENSOR WITH A SURFACE HAVING PROJECTION SHAPE

(71) Applicant: Korea Advanced Institute of Science And Technology, Daejeon (KR)

(72) Inventors: Jun-Bo Yoon, Daejeon (KR); Jae-young Yoo, Daejeon (KR); Min-Ho Seo, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 204 days.

(21) Appl. No.: 15/890,898

(22) Filed: Feb. 7, 2018

(65) Prior Publication Data

US 2018/0266898 A1 Sep. 20, 2018

(30) Foreign Application Priority Data

Mar. 17, 2017 (KR) .......................... 10-2017-0034012

(51) Int. Cl.
*G01L 1/14* (2006.01)
(52) U.S. Cl.
CPC .................................. *G01L 1/146* (2013.01)
(58) Field of Classification Search
None
See application file for complete search history.

(56) References Cited

U.S. PATENT DOCUMENTS

2008/0246735 A1 10/2008 Reynolds et al.
2009/0239325 A1 9/2009 Silverbrook et al.

FOREIGN PATENT DOCUMENTS

| KR | 10-2012-0047493 A | 5/2012 |
| KR | 10-1309934 B1 | 10/2013 |
| KR | 10-2016-0125565 A | 11/2016 |

OTHER PUBLICATIONS

Office Action dated Aug. 28, 2018 in related Korean Appl. 10-2017-0034012 (8 pgs.).

*Primary Examiner* — Harshad R Patel
*Assistant Examiner* — Nigel H Plumb
(74) *Attorney, Agent, or Firm* — Foley & Lardner LLP

(57) ABSTRACT

A pressure sensor includes a substrate whose top surface is formed in the form of a projection, a first electrode formed on one side of the top surface of the substrate, a second electrode formed on the other side of the top surface and spaced apart from the first electrode; and a dielectric material layer formed on the top surface of the substrate and fills a space between the first electrode and the second electrode. A pressure applied in a direction perpendicular to the top surface of the substrate causes a change in the dielectric constant of the dielectric material layer. The magnitude of the pressure is sensed by detecting a capacitance which changes according to the change in the dielectric constant. The projection forms a stress concentration structure, through which the dielectric constant change amount according to the pressure becomes larger, thereby improving sensitivity of the pressure sensor.

11 Claims, 13 Drawing Sheets

MULTIAXIAL TACTILE SENSOR INCLUDING A PRESSURE SENSOR WITH A SURFACE HAVING PROJECTION SHAPE

CROSS REFERENCE TO RELATED APPLICATIONS

This application claims priority to Korean Application No. 10-2017-0034012 filed Mar. 17, 2017, the contents of which are herein incorporated by reference in their entirety.

BACKGROUND

Field

The present disclosure relates to a pressure sensor including laterally arranged electrodes on a coplanar surface, a method of fabricating the same, and a multiaxial tactile sensor using the pressure sensor, and more particularly to a pressure sensor including laterally arranged electrodes on a substrate having its projection-shaped surface or grating-shaped surface, a method of fabricating the same, and a multiaxial tactile sensor using the pressure sensor.

Description of the Related Art

It is advantageous to use a capacitive pressure sensor as a pressure sensor because the capacitive pressure sensor not only is capable of sensing dynamic/static pressure but also has low power consumption. In order to implement a high performance capacitive pressure sensor in the past, a microstructure is formed between electrodes, and it is tried to increase the change of the distance between the electrodes due to a pressure. However, the pressure sensor using this method is disadvantageous in terms of mechanical stability and has a limited operating range thereof.

Additionally, there is research on a pressure sensor which uses a change in dielectric constant depending on the change of the pressure magnitude by using a nanomaterial such as nanofiber. The pressure sensor using this method needs to use a nanomaterial having a high concentration for the purpose of sensitivity improvement. However, the use of the nanomaterial having a high concentration reduces mechanical stability and reduces transmittance.

Therefore, there is a need to implement a new type of the capacitive pressure sensor.

SUMMARY

One embodiment is a pressure sensor including laterally arranged electrodes on a coplanar surface. The pressure sensor includes: a substrate whose top surface is formed in the form of a projection; a first electrode which is formed on one side of the top surface of the substrate; a second electrode which is formed on the other side of the top surface of the substrate and is spaced apart from the first electrode; and a dielectric material layer which is formed on the top surface of the substrate and fills a space between the first electrode and the second electrode. A pressure applied in a direction perpendicular to the top surface of the substrate causes a change in the dielectric constant of the dielectric material layer. The magnitude of the pressure is sensed by detecting a capacitance which changes according to the change in the dielectric constant.

The dielectric material layer may be conformally formed on the top surface of the substrate.

Nanoparticles may be injected into the dielectric material layer.

The nanoparticle may be a metallic material.

The top surface of the substrate may include a protrusion portion and a concave portion. When a pressure is applied, stress may be increased at the corner of the protrusion portion.

The first electrode may be formed on the substrate to extend in a first direction in which the projection shape is continuously arranged or may be formed to extend in a second direction perpendicular to the first direction.

The second electrode may be formed to extend on the substrate in the first direction or in the second direction.

The projection shape may form a stress concentration structure. Transmittance may be improved by reducing light reflection on the top surface of the substrate through the stress concentration structure.

Another embodiment is a method for forming the pressure sensor including laterally arranged electrodes on a coplanar surface. The method includes: forming a first substrate having flexible characteristics and a first projection shape; patterning an electrode pattern on the first substrate; and applying a passivation material on the first substrate and on the electrode pattern.

The method may further include removing a portion of the cured passivation material so that a portion of the electrode pattern is exposed outward.

The forming the first substrate may include providing a second substrate having a second projection shape formed thereon which corresponds to the first projection shape, applying a material having flexible characteristics to the second substrate, curing the material having flexible characteristics, and completing the first substrate by removing the second substrate.

The patterning the electrode pattern on the first substrate may include: forming, on the first substrate, a photoresist film pattern on which the electrode pattern is engraved; applying an electrode material on the photoresist film pattern; and completing the electrode pattern on the first substrate by removing the photoresist film pattern and the electrode material formed on the photoresist film pattern.

The removing the photoresist film pattern and the electrode material formed on the photoresist film pattern may use a lift-off process.

The passivation material may include a dielectric material.

The passivation material may include nanoparticles.

The electrode pattern may be conformally formed on the first substrate in conformity with the first projection shape.

The electrode pattern may be formed to have a comb shape.

Further another embodiment is a multiaxial tactile sensor using the pressure sensor including laterally arranged electrodes on a coplanar surface according to the above embodiments. The multiaxial tactile sensor includes: a pressure sensor array in which the pressure sensors including the laterally arranged electrodes on a coplanar surface according to claims 1 to 8 are arranged in the form of an array; a cover which entirely covers the pressure sensor array; and a bump structure which is formed on the cover.

The pressure sensors of the pressure sensor array may be arranged in the form of an array of 2×2.

The multiaxial tactile sensor may operate such that a compressive force is applied to the pressure sensor disposed in a third direction and a tensile force is applied to the pressure sensor disposed in a fourth direction reverse to the third direction.

Other details of the present invention are included in the detailed description and drawings.

DETAILED DESCRIPTION

The features, advantages and method for accomplishment of the present invention will be more apparent from referring to the following detailed embodiments described as well as the accompanying drawings. However, the present invention is not limited to the embodiments to be disclosed below and is implemented in different and various forms. The embodiments bring about the complete disclosure of the present invention and are only provided to make those skilled in the art fully understand the scope of the present invention. The present invention is just defined by the scope of the appended claims.

While terms such as the first and the second, etc., can be used to describe various components, the components are not limited by the terms mentioned above. The terms are used only for distinguishing between one component and other components. Therefore, the first component to be described below may be the second component within the spirit of the present invention.

Terms used in the present specification are provided for description of only specific embodiments of the present invention, and not intended to be limiting. In the present specification, an expression of a singular form includes the expression of plural form thereof if not specifically stated. The terms "comprises" and/or "comprising" used in the specification is intended to specify characteristics, numbers, steps, operations, components, parts or any combination thereof which are mentioned in the specification, and intended not to exclude the existence or addition of at least one another characteristics, numbers, steps, operations, components, parts or any combination thereof.

Unless differently defined, all terms used herein including technical and scientific terms have the same meaning as commonly understood by one of ordinary skill in the art to which the present invention belongs. Also, commonly used terms defined in the dictionary should not be ideally or excessively construed as long as the terms are not clearly and specifically defined in the present application.

Hereinafter, preferred embodiments in accordance with the present invention will be described with reference to the accompanying drawings. The preferred embodiments are provided so that those skilled in the art can sufficiently understand the present invention, but can be modified in various forms and the scope of the present invention is not limited to the preferred embodiments.

Figure 1:
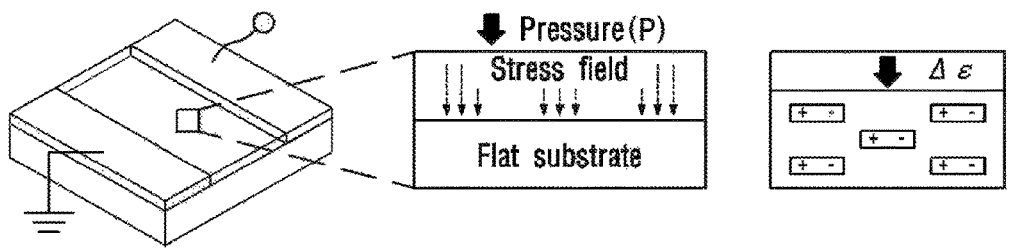
FIG. 1 is a view showing the change in the dielectric constant according to the pressure and structure of a flat pressure sensor.
Figure 2:
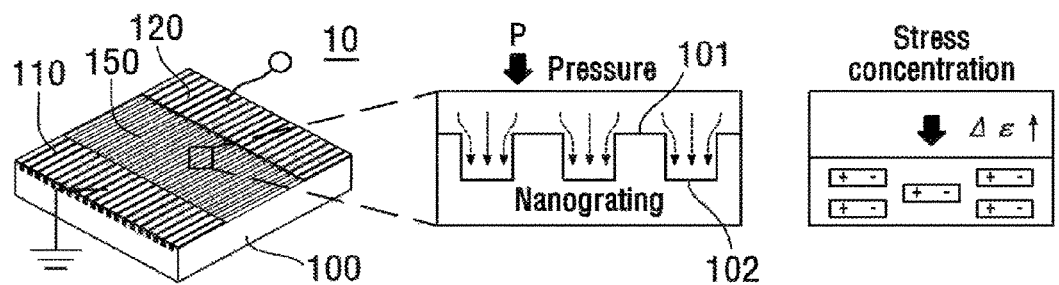
FIG. 2 is a view showing the change in the dielectric constant according to the pressure and structure of a pressure sensor according to an embodiment of the present invention.
Figure 3:
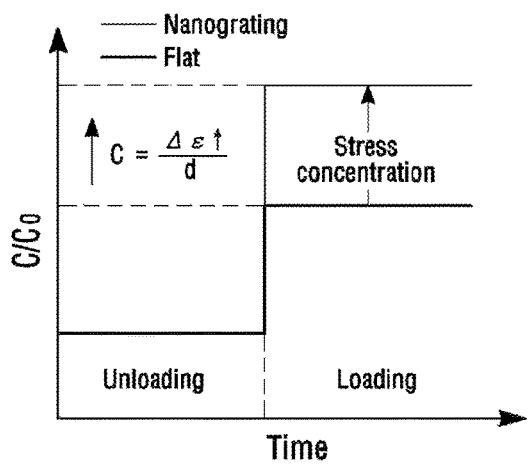
FIG. 3 is a graph for comparing stress concentration effects of the pressure sensors of FIGS. 1 and 2.

FIG. 1 is a view showing the change in the dielectric constant according to the pressure and structure of a flat pressure sensor. FIG. 2 is a view showing the change in the dielectric constant according to the pressure and structure of a pressure sensor according to an embodiment of the present invention. FIG. 3 is a graph for comparing stress concentration effects of the pressure sensors of FIGS. 1 and 2.

Referring to FIG. 1, the flat pressure sensor is formed by forming a dielectric material layer on a flat substrate. A large change in the dielectric constant of a nanomaterial included in the dielectric material layer does not occur compared to a pressure P which is applied in the direction perpendicular to the top surface of the substrate.

FIG. 2 shows the structure of a pressure sensor 10 according to the embodiment of the present invention and shows a result obtained by applying the pressure P in the direction perpendicular to the top surface of a substrate of the pressure sensor 10.

Referring to FIG. 2, the pressure sensor 10 according to the embodiment of the present invention include a substrate 100, a first electrode 110, a dielectric material layer 150, and a second electrode 120.

The substrate 100 supports the first electrode 110 and the second electrode 120. The top surface of the substrate 100 has a grating shape. The grating shape means that the top surface (i.e., the surface) of the substrate 100 is formed to have an uneven structure. Particularly, the top surface of the substrate 100 includes a protrusion portion 101 and a concave portion 102 because the uneven structure is formed on the top surface of the substrate 100. Besides, the pressure sensor 10 according to the embodiments of the present invention may be formed such that the top surface of the substrate 100 has a projection shape. The projection shape does not necessarily have a shape with angled corners, and both a continuously extending shape and a disconnected shape can be applied to the projection shape. Hereinafter, the technical spirit of the present invention will be illustratively described by using a structure in which the top surface of the substrate 100 is formed in the form of the grating shape.

The grating shape formed on the top surface of the substrate 100 may have a nanometer unit. The width of the protrusion portion 101 may have a nanometer unit and the width of the concave portion 102 may have a nanometer unit.

The substrate 100 may be made of glass having a high strength and high transmittance or made of plastic having flexibility. The embodiment of the present invention is not limited to this.

The first electrode 110 may be formed on one side of the substrate 100 and the second electrode 120 may be formed on the other side of the substrate 100. That is, the first electrode 110 and the second electrode 120 are spaced apart from each other, and the dielectric material layer 150 is filled therebetween. The first electrode 110, the dielectric material layer 150, and the second electrode 120 may operate as a capacitor.

For example, the first electrode 110 may be connected to the ground and the second electrode 120 may be connected to a positive voltage source. The dielectric material layer 150 may serve as a dielectric between the first electrode 110 and the second electrode 120.

The pressure sensor 10 according to the embodiments of the present invention has a structure in which the first electrode 110 and the second electrode 120 are disposed spaced apart from each other on the top surface of the substrate 100 in a horizontal direction. That is, the pressure P applied in the direction perpendicular to the top surface of the substrate 100 may cause the change in the dielectric constant of the dielectric material layer 150, and the capacitance of the capacitor may change according to the change in the dielectric constant of the dielectric material layer 150. The magnitude of the pressure P can be sensed based on the change of the capacitance. The function to determine the magnitude of the pressure P on the basis of the capacitance change of the capacitor due to the change in the dielectric constant of the dielectric material layer 150 may be performed by a controller of the pressure sensor 10. The controller may be included as a component of the pressure sensor 10 or may be provided independently of the pressure sensor 10. That is, an access processor (AP) or a pressure sensing controller may be formed as the controller outside the pressure sensor 10.

The first electrode 110 and the second electrode 120 which are disposed on the top surface of the substrate 100 are disposed spaced apart from each other with respect to the top surface of the substrate 100 in a horizontal direction. This means that the pressure sensor 10 includes laterally arranged electrodes on a coplanar surface. The entire thickness of the pressure sensor 10 (i.e., the thickness in the direction perpendicular to the top surface of the substrate 100) becomes smaller than that of a conventional capacitive pressure sensor because the pressure sensor 10 includes laterally arranged electrodes. This is advantageous for making the pressure sensor 10 smaller, thereby reducing a mounting space even when the pressure sensor 10 is mounted and used in another equipment.

Further, in the pressure sensor 10 according to the embodiments of the present invention, the first electrode 110 and the second electrode 120 are formed in conformity with the grating shape formed on the top surface of the substrate 100. That is, the first electrode 110 and the second electrode 120 may be conformally formed on the top surface of the substrate 100. The dielectric material layer 150 may be also conformally formed in conformity with the grating shape formed on the top surface of the substrate 100. Since the substrate 100 includes this grating shape (e.g., a nanograting structure), stress is concentrated at the corner of the protrusion portion 101 of the top surface of the substrate 100.

Further, in the pressure sensor 10 according to the embodiments of the present invention, the first electrode 110 may be formed to extend in a first direction in which the grating shapes formed on the top surface of the substrate 100 are arranged side by side (the direction of FIG. 2 in which the first electrode 110 is arranged to extend). However, the embodiment of the present invention is not limited thereto. That is, the first electrode 110 may be formed to extend in a second direction perpendicular to the first direction (unlike FIG. 2, the direction perpendicular to the direction in which the grating shapes are arranged side by side).

Likewise, in the pressure sensor 10 according to the embodiments of the present invention, the second electrode 120 may be formed to extend in the first direction in which the grating shapes formed on the top surface of the substrate 100 are arranged side by side (the direction of FIG. 2 in which the second electrode 120 is arranged to extend). However, the embodiment of the present invention is not limited thereto. That is, the second electrode 120 may be formed to extend in the second direction perpendicular to the first direction (unlike FIG. 2, the direction perpendicular to the direction in which the grating shapes are arranged side by side).

Referring to FIG. 2, the stress applied to the dielectric material layer 150 by the pressure P applied in the direction perpendicular to the top surface of the substrate 100 intensively increases at the corner of the protrusion portion 101, so that the change in the dielectric constant of the dielectric material layer 150 may further increase. Through a comparison of FIG. 1 and FIG. 2, the stress concentration is further increased in the substrate structure having the grating shape, leading to the change in the dielectric constant of the dielectric material layer 150.

Also, nanoparticles (hereinafter, referred to as "nanomaterials") may be injected into the dielectric material layer 150, thereby further improving the degree of detection of the change in the dielectric constant. The nanoparticle may be a metallic material. However, the embodiment of the present invention is not limited thereto.

The capacitance C is represented by ε*A/d. Since a cross sectional area A in which the first electrode 110 and the second electrode 120 face each other remains almost the same and a distance d between the first electrode 110 and the second electrode 120 remains almost the same, the capacitance change is detected according to the change in the dielectric constant (ε) of the dielectric material layer 150. The change amount of the dielectric constant of the pressure sensor 10 according to the embodiment of the present invention is greater than the pressure sensor including the flat substrate. Therefore, the sensitivity for sensing the magnitude of the pressure P can be improved.

The pressure sensor 10 according to the embodiments of the present invention uses a stress concentration structure (nano-grating structure). Therefore, when almost the same pressure P is applied to the pressure sensor including the flat substrate and to the pressure sensor 10 according to the embodiment of the present invention, stress is concentrated around the protrusion portion 101 of the pressure sensor 10 according to the embodiment of the present invention, so that the dielectric constant change amount according to the pressure becomes larger. Then, the sensitivity of the pressure sensor 10 can be improved because the dielectric constant change amount becomes larger with respect to almost the same pressure P.

Further, the pressure sensor 10 according to the embodiments of the present invention improves the sensitivity through the stress concentration structure, thereby reducing the amount of the nanomaterial included in the dielectric material layer 150. Accordingly, light transmittance of the pressure sensor 10 can be enhanced. In the past, the nanomaterial used as a dielectric is included with a high concentration and thus the sensitivity of the pressure sensor 10 had to be enhanced. However, according to the embodiment of the present invention, the sensitivity of the pressure sensor 10 is improved through the stress concentration structure. Therefore, the operation of the pressure sensor is not greatly affected even though the nanomaterial having a relatively low concentration is included in the dielectric material layer 150. As a result, since the nanomaterial is included with a low concentration in the dielectric material layer 150, the light transmittance of the entire pressure sensor 10 can be improved. This is because the nanomaterial having a high concentration has a relatively greater amount of reflected light.

Hereinafter, a material forming the first electrode 110 and the second electrode 120 will be described. The first electrode 110 and the second electrode 120 are made of a conductive material. When the pressure sensor 10 is applied in a touch display device, a biosensor, etc., the first electrode 110 and the second electrode 120 may be made of a transparent conductive oxide (TCO) such as an indium tin oxide (ITO), indium zinc oxide (IZO), etc., in order to prevent that the visibility is lowered by the first electrode 110 and the second electrode 120.

Further, the first electrode 110 and the second electrode 120 may be formed of Ag nanowire, carbon nanotube (CNT), graphene, or the like, which has excellent transmittance and excellent electric conductivity. According to the embodiments of the present invention, the first electrode 110 and the second electrode 120 may be formed of a mesh-shaped metal line. Alternatively, the first electrode 110 and the second electrode 120 may be formed in the form of combs arranged opposite to each other, and the branches of the combs may be alternately arranged with each other. In this case, the first electrode 110 and the second electrode 120 may have overall transparency by causing the metal line or branch to be formed to have a small width.

The dielectric material layer 150 is formed on the top surface of the substrate 100 and fills a space between the first electrode 110 and the second electrode 120. For example, the dielectric material layer 150 electrically isolates the first electrode 110 and the second electrode 120 from each other. The first electrode 110 and the second electrode 120 constitute the capacitor such that the dielectric material layer 150 is placed therebetween. The intensity of the pressure can be measured on the basis of a capacitance change amount between the first electrode 110 and the second electrode 120.

Figure 4A:
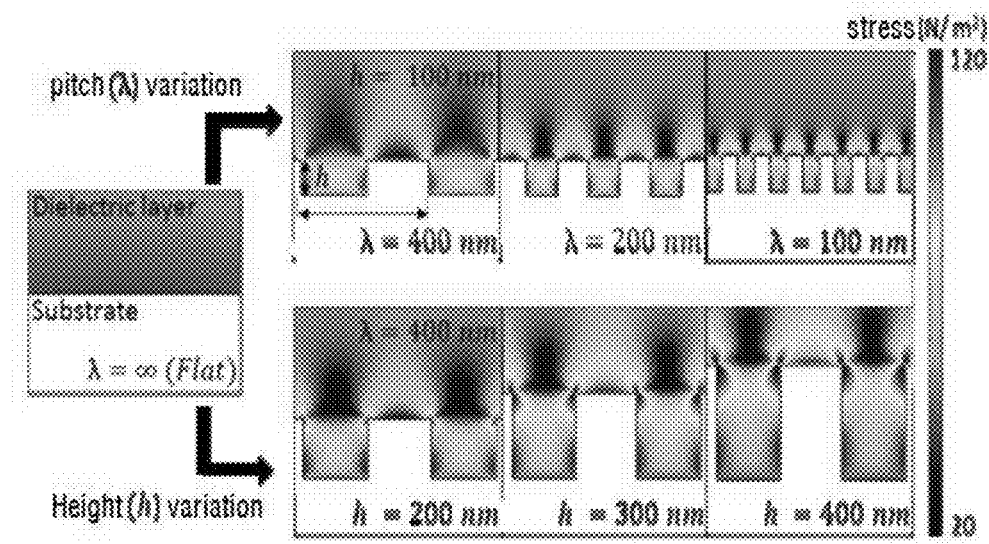
FIG. 4A is a simulation result showing stress concentration on a stress concentration structure of the pressure sensor according to the embodiment of the present invention.
Figure 4B:
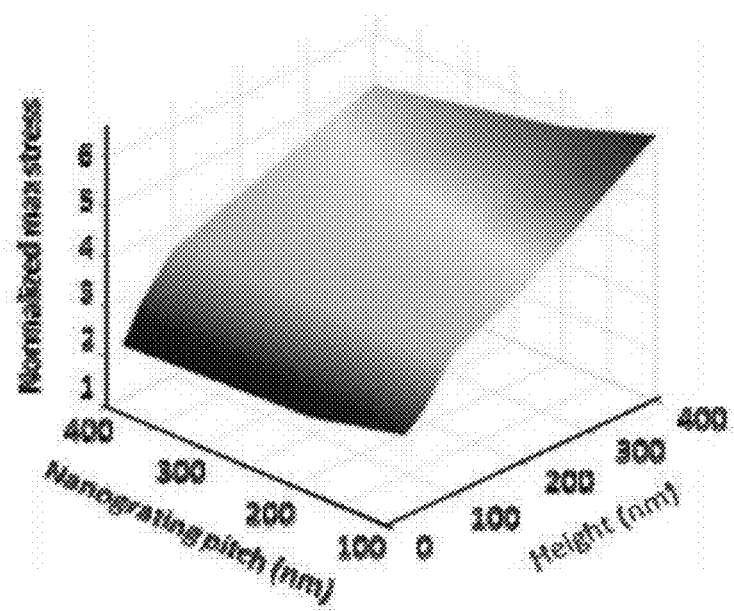
FIG. 4B is a simulation result showing a maximum stress enhancement ratio of the pressure sensor including a substrate having a grating shape compared to the pressure sensor including a flat substrate.

FIG. 4A is a simulation result showing stress concentration on the stress concentration structure of the pressure sensor according to the embodiment of the present invention. FIG. 4B is a simulation result showing a maximum stress enhancement ratio of the pressure sensor including the substrate having the grating shape compared to the pressure sensor including the flat substrate.

Referring to FIG. 4A, it can be discovered that the stress concentration effect appears at the corner of the protrusion portion 101 of the grating shape formed on the substrate 100 (FEM simulation result). FIG. 4B shows a simulation result according to a pitch and a height of the grating shape. Referring to FIGS. 4A and 4B, it can be understood that the narrower the grating-shaped pitch and the greater the height of the pitch, the stress concentration effect increases.

Figure 5A:
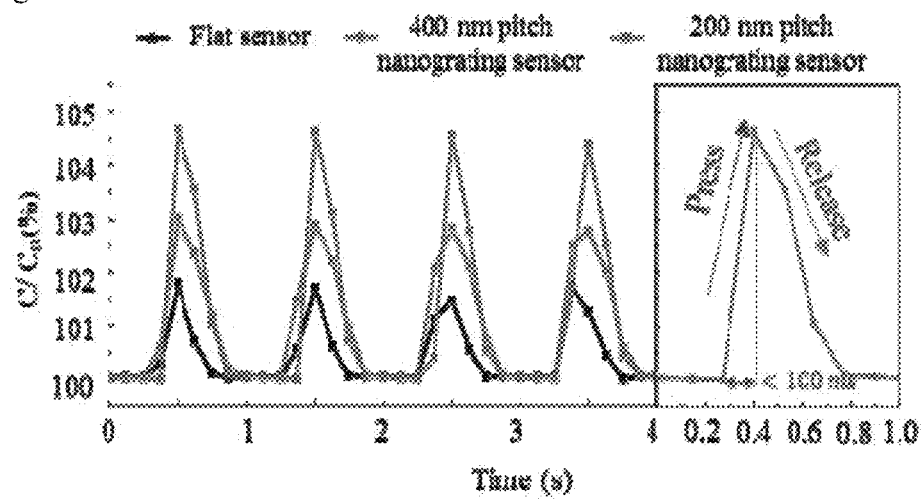
FIG. 5A is a graph showing a capacitance change according to a grating-shaped pitch.
Figure 5B:
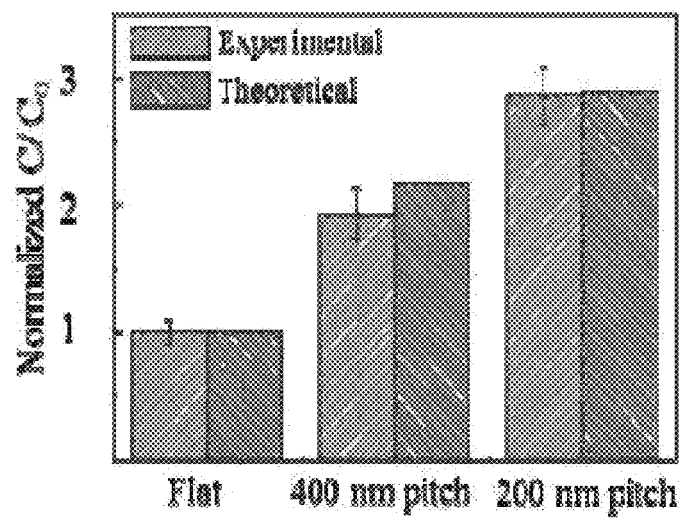
FIG. 5B is a graph showing a result obtained by matching experimental values and theoretical values.
Figure 5C:
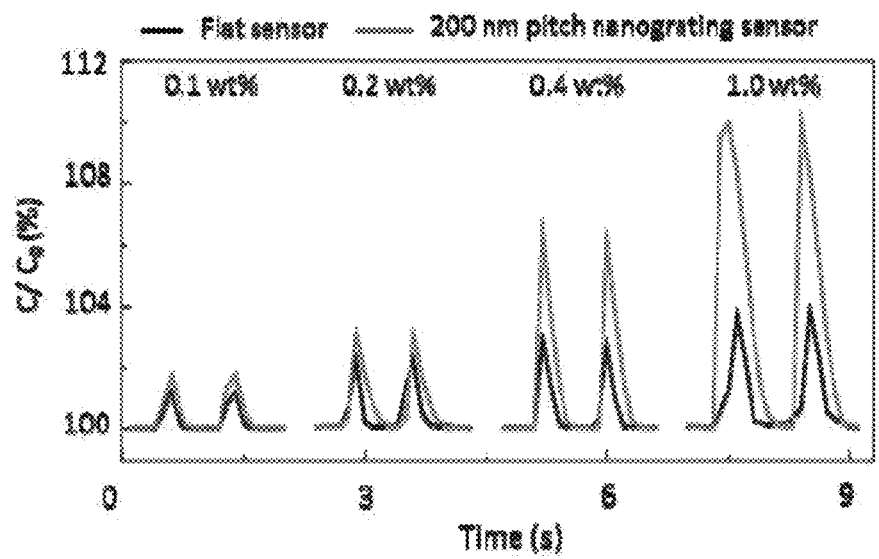
FIG. 5C is a graph showing a capacitance change amount according to the concentration of a nanomaterial included in a dielectric material layer.
Figure 5D:
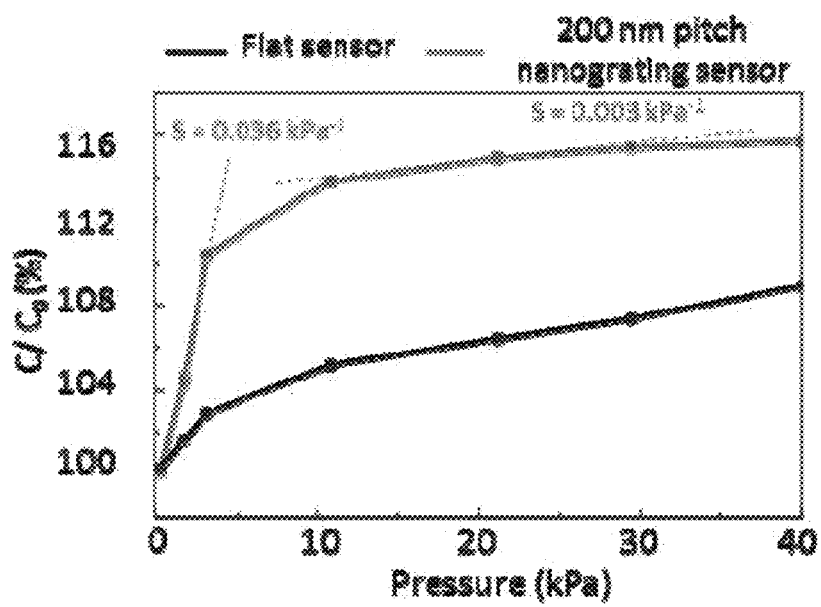
FIG. 5D is a graph showing the capacitance change amount according to a pressure change.

FIG. 5A is a graph showing the capacitance change according to a grating-shaped pitch. FIG. 5B is a graph showing a result obtained by matching experimental values and theoretical values. FIG. 5C is a graph showing the capacitance change amount according to the concentration of the nanomaterial included in the dielectric material layer. FIG. 5D is a graph showing the capacitance change amount according to a pressure change.

Referring to FIGS. 5A to 5D, it can be seen that the sensitivity performance of the pressure sensor 10 according to the embodiments of the present invention is significantly improved. Specifically, FIG. 5A shows that a value of $C/C_0$ (i.e., a capacitance value that changes when the pressure is applied compared to an initial capacitance value) of the pressure sensor 10 having the grating shape according to the embodiment of the present invention becomes larger than that of the pressure sensor including the flat substrate. This means that the capacitance change amount detected by the pressure sensor 10 is large for the same pressure, which demonstrates that the sensitivity of the pressure sensor is improved. It can be seen that the sensitivity of the pressure sensor is further improved with the reduction of the grating-shaped pitch.

Referring to FIG. 5B, with regard to both the pressure sensor including the flat substrate and the pressure sensor 10 having the grating shape, it can be appreciated that the experimental value of $C/C_0$ and the theoretical value of $C/C_0$ are almost the same as each other.

FIG. 5C shows the differences in the values of $C/C_0$ between the pressure sensor including the flat substrate and the pressure sensor 10 having the grating shape are compared according to the increase of the concentration of the nanomaterial included in the dielectric material layer. Through FIG. 5C, it can be seen that, when the concentration of the nanomaterial increases ten times from 0.1 wt % to 1.0 wt %, the value of $C/C_0$ of the pressure sensor 10 having the grating shape increases remarkably, so that the sensitivity of the pressure sensor is sufficiently improved. Contrary to this, even when the concentration of the nanomaterial increases ten times from 0.1 wt % to 1.0 wt %, the value of $C/C_0$ of the pressure sensor including the flat substrate remains almost the same. Eventually, this shows that the nanomaterial having a much higher concentration is required to improve the sensitivity of the pressure sensor.

Referring to FIG. 5D, it can be seen that the value of $C/C_0$ according to the increase of the pressure in the pressure sensor 10 having the grating shape is much greater than the value of $C/C_0$ according to the increase of the pressure in the pressure sensor including the flat substrate. This shows the improvement of the sensitivity of the pressure sensor 10.

Figure 6A:
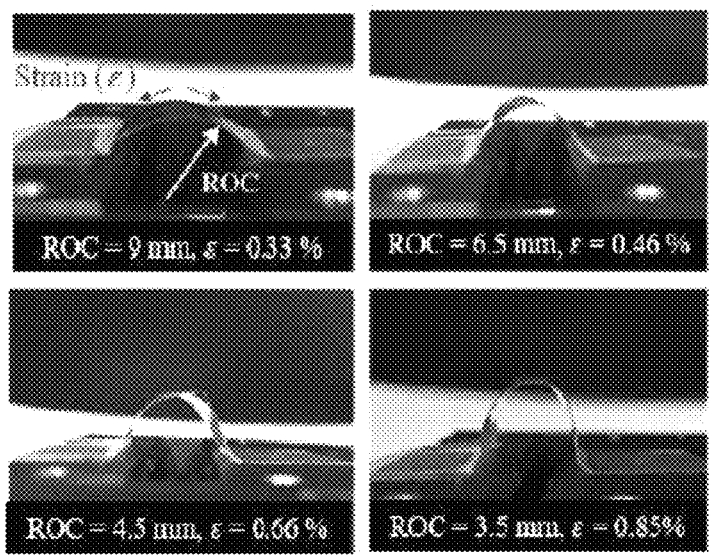
FIG. 6A is a view showing an optical image according to a radius of curvature (ROC) for the pressure sensor according to the embodiment of the present invention.
Figure 6B:
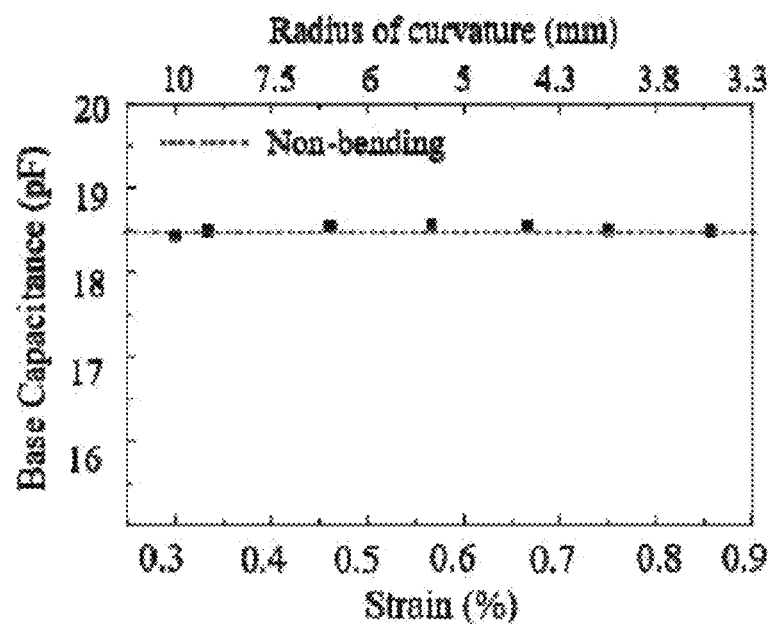
FIG. 6B is a graph showing the change of an initial capacitance value according to Bending radius.
Figure 6C:
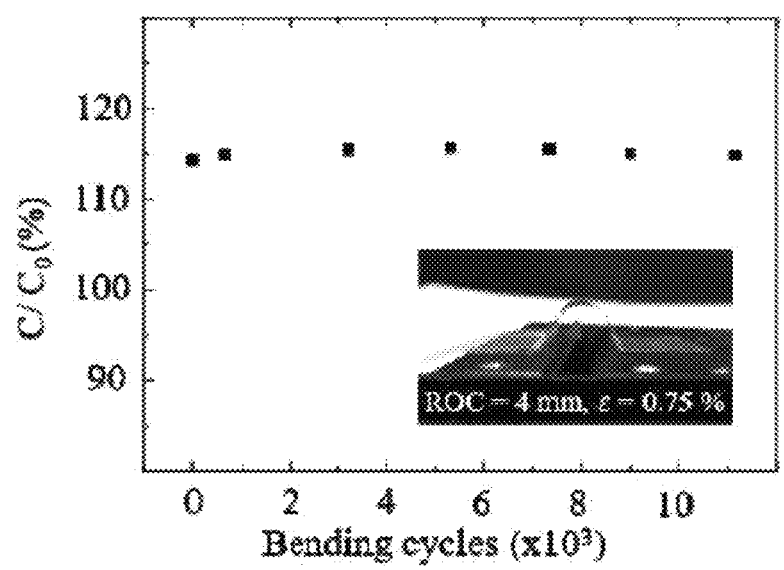
FIG. 6C is a graph showing sensitivity change of the pressure sensor according to the number of Bending.
Figure 6D:
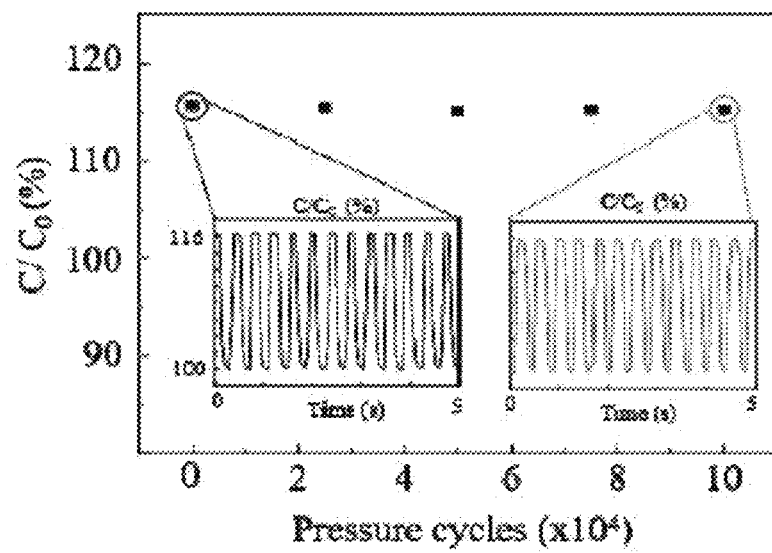
FIG. 6D is a graph showing the sensitivity change of the pressure sensor according to how many times the pressure is applied.

FIG. 6A is a view showing an optical image according to a radius of curvature (ROC) for the pressure sensor according to the embodiment of the present invention. FIG. 6B is a graph showing the change of the initial capacitance value according to Bending radius. FIG. 6C is a graph showing sensitivity change of the pressure sensor according to the number of Bending. FIG. 6D is a graph showing the sensitivity change of the pressure sensor according to how many times the pressure is applied.

FIGS. 6A to 6D are views for demonstrating the mechanical stability of the pressure sensor 10 according to the embodiment of the present invention. With reference to the figures, the pressure sensor 10 according to the embodiment of the present invention operates with significant durability without being greatly affected by the Bending radius, the number of Bending or how many times the pressure is applied. Substantially, even when the pressure sensor 10 performs the sensing operation repeatedly for a long period of time, the mechanical stability of the pressure sensor 10 can be ensured.

Hereinafter, a method of fabricating the pressure sensor according to the embodiment of the present invention will be described with reference to FIG. 7.

Figure 7:
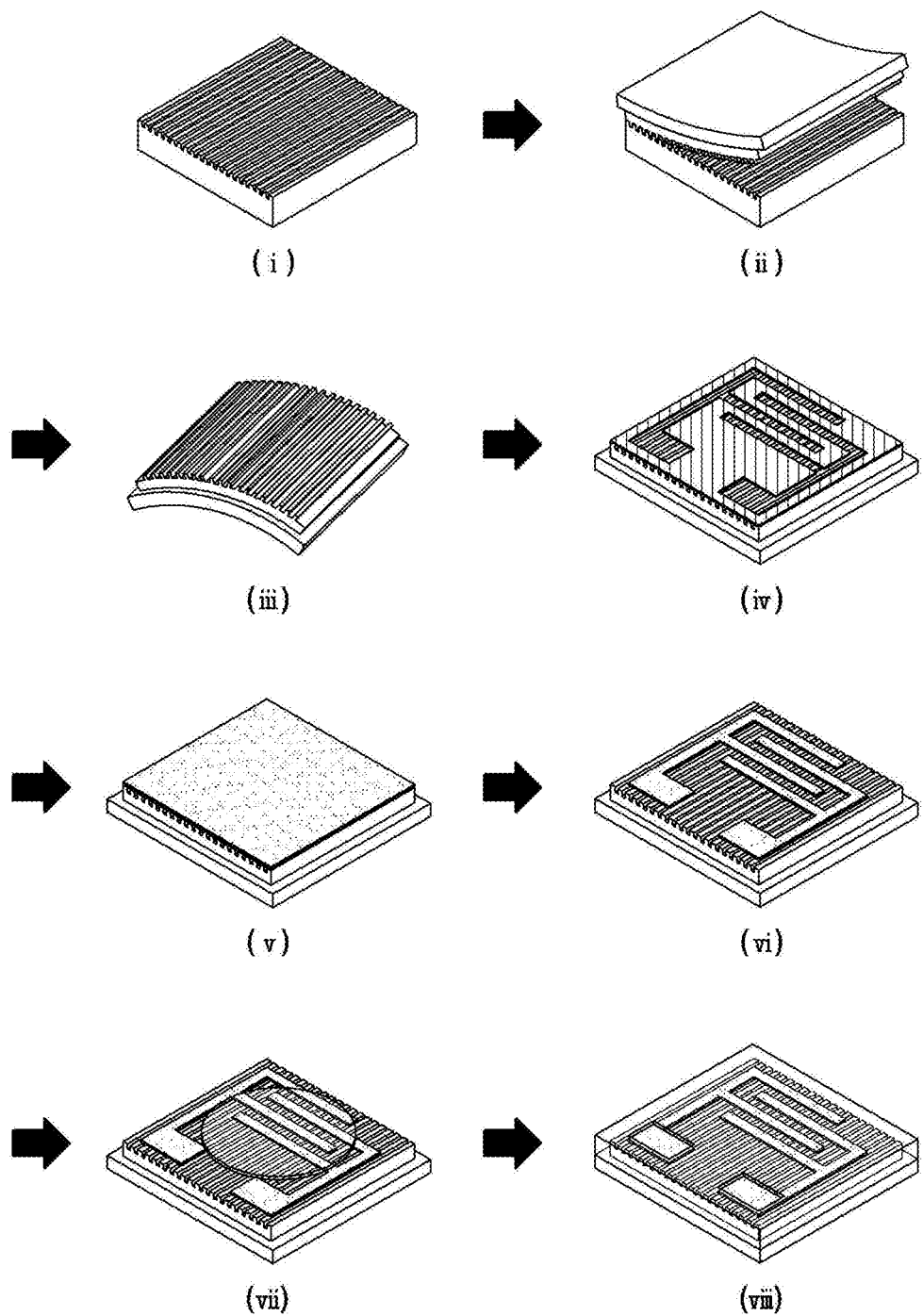
FIG. 7 is a view showing a method of fabricating the pressure sensor according to the embodiment of the present invention.

FIG. 7 is a view showing a method of fabricating the pressure sensor according to the embodiment of the present invention. Referring to FIG. 7, in the method of fabricating the pressure sensor according to the embodiment of the present invention, first, a second substrate having a second grating shape formed thereon is provided (i). For example, the second substrate may have the second grating shape made of silicon.

Next, after a material having flexible characteristics is applied to the second substrate, the second grating shape on the second substrate is transferred and cured (ii). Then, the second substrate is removed, and the material having flexible characteristics is cured, so that a flexible substrate (first substrate) may be completed (iii). This flexible substrate (first substrate) may be, for example, made of a plastic material. The second grating shape is transferred to the flexible substrate (first substrate), and thus, a first grating shape corresponding to the second grating shape may be formed.

Next, a photoresist film pattern on which an electrode pattern is engraved is formed on the flexible substrate (first substrate) (iv). What the electrode pattern is engraved means that a portion of the photoresist film pattern, which corresponds to the electrode pattern, has been removed.

Next, an electrode material is applied on the photoresist film pattern (v). Then, the electrode pattern is completed on the flexible substrate (first substrate) by removing the photoresist film pattern and the electrode material formed on the photoresist film pattern. Here, the removing of the photoresist film pattern and the electrode material formed on the photoresist film pattern may be performed by using a lift-off process. The lift-off process means that after a photoresist film is patterned on a substrate, another thin film is coated thereon and the photoresist film is easily removed (i.e., lifted off), so that a pattern of the thin film, which is inverted with respect to the photoresist film pattern, remains on the substrate.

Next, a passivation material is applied and cured on the flexible substrate (first substrate) and the electrode pattern (vii). FIG. 7 shows a transparent passivation material. For example, the passivation material includes a dielectric material. Also, the passivation material may include the nanomaterial. Here, the nanomaterial may be a metallic material. However, the embodiment of the present invention is not limited thereto.

Then, a portion of the cured passivation material is removed (in other words, a portion of the passivation material is removed such that the connection part of the electrode pattern is exposed outward) so that a portion of the electrode pattern (i.e., the connection part) is exposed outward (viii). Here, the electrode pattern may be conformally formed on the flexible substrate (first substrate) in conformity with the first grating shape. Illustratively, the electrode pattern is formed to have a comb shape, thereby increasing the space utilization.

By using the above method, the pressure sensor 10 according to the embodiment of the present invention can be fabricated to include the transparent electrode and a transparent substrate. Also, the pressure sensor having the improved light transmittance can be implemented by using the nanomaterial having a low concentration.

Figure 8A:
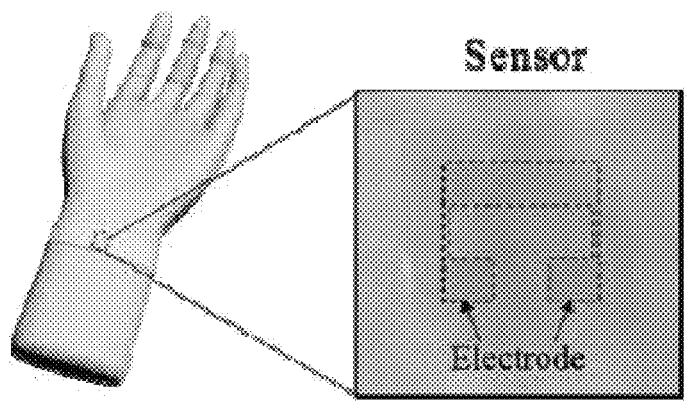
FIG. 8A shows an optical photo of the pressure sensor fabricated by using a transparent electrode and a transparent substrate.
Figure 8B:
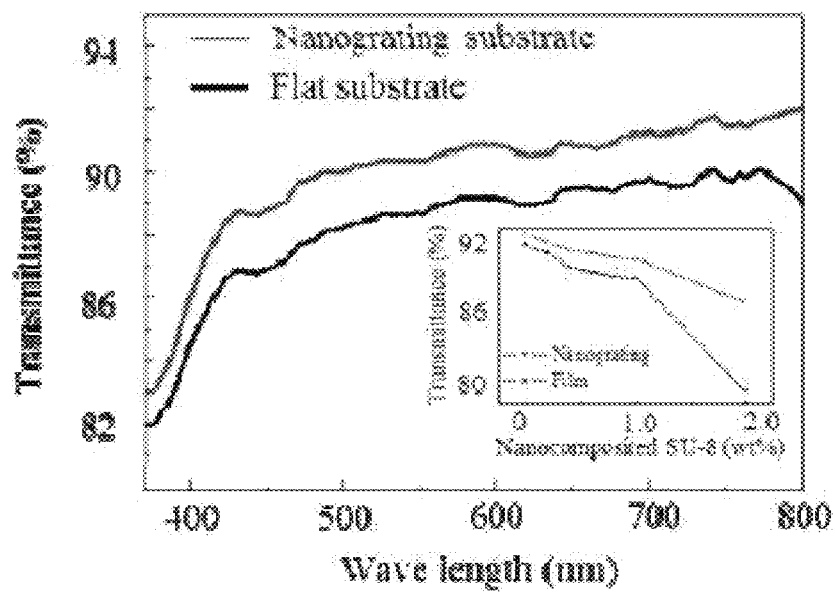
FIG. 8B is a graph showing a comparison of light transmittance of the pressure sensor including the flat substrate and light transmittance of the pressure sensor having the grating shape.

FIG. 8A shows an optical photo of the pressure sensor fabricated by using the transparent electrode and the transparent substrate. FIG. 8B is a graph showing a comparison of the light transmittance of the pressure sensor including the flat substrate and the light transmittance of the pressure sensor having the grating shape.

Hereinafter, fields of application of the pressure sensor according to the embodiment of the present invention will be described.

Figure 9A:
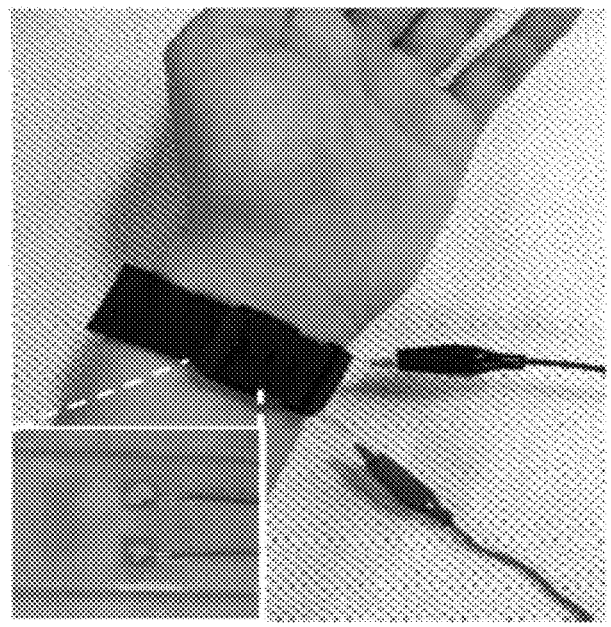
FIG. 9A is a view showing an example where the pressure sensor according to the embodiment of the present invention has been applied to a biosensor.
Figure 9B:
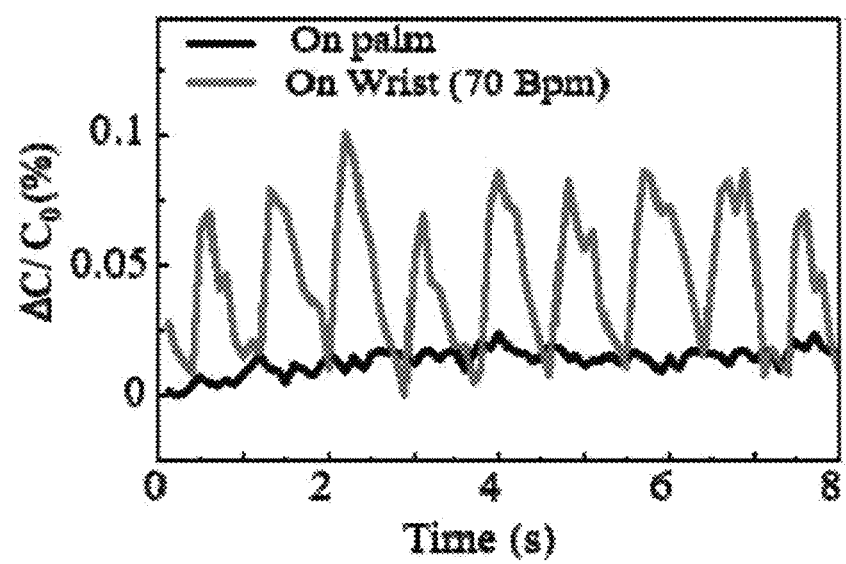
FIG. 9B is a graph showing a result of measuring pulses on wrist and palm by using the biosensor of FIG. 9A.
Figure 9C:
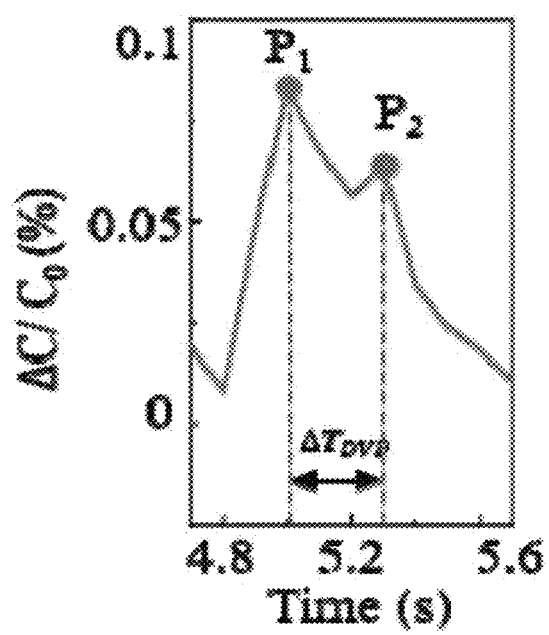
FIG. 9C is an enlarged graph for precisely analyzing the pulse measurement graph of FIG. 9B.

FIG. 9A is a view showing an example where the pressure sensor according to the embodiment of the present invention has been applied to a biosensor. FIG. 9B is a graph showing a result of measuring pulses on wrist and palm by using the biosensor of FIG. 9A. FIG. 9C is an enlarged graph for precisely analyzing the pulse measurement graph of FIG. 9B.

Referring to FIGS. 9A to 9C, the pressure sensor according to the embodiment of the present invention can be applied to a biosensor and be operated. The pressure sensor is formed of the transparent electrode and the transparent substrate to reduce uncomfortable feeling when the pressure sensor is applied to a living body. After the initial setup of the biosensor, a pulse can be measured by using the pressure sensor according to the embodiment of the present invention. Referring to FIG. 9C, a pulse measurement result is enlarged and then the pulse can be precisely analyzed in detail.

Figure 10A:
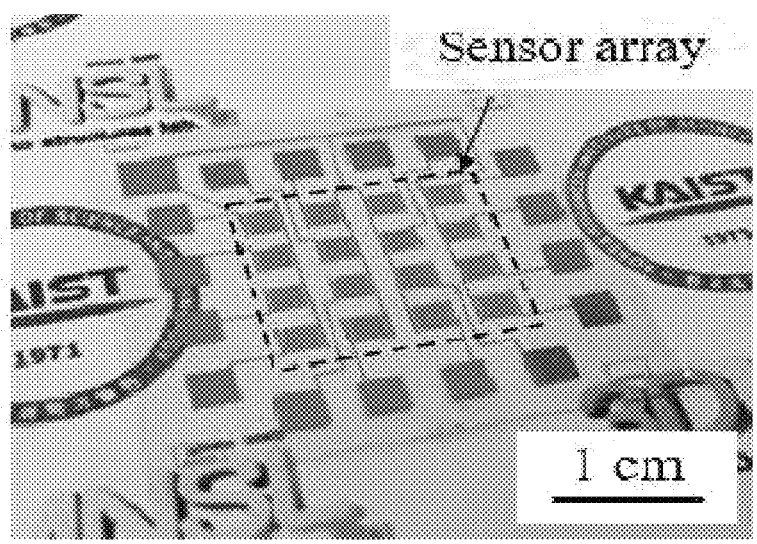
FIG. 10A is a view showing a sensor array including the pressure sensor according to the embodiment of the present invention.
Figure 10B:
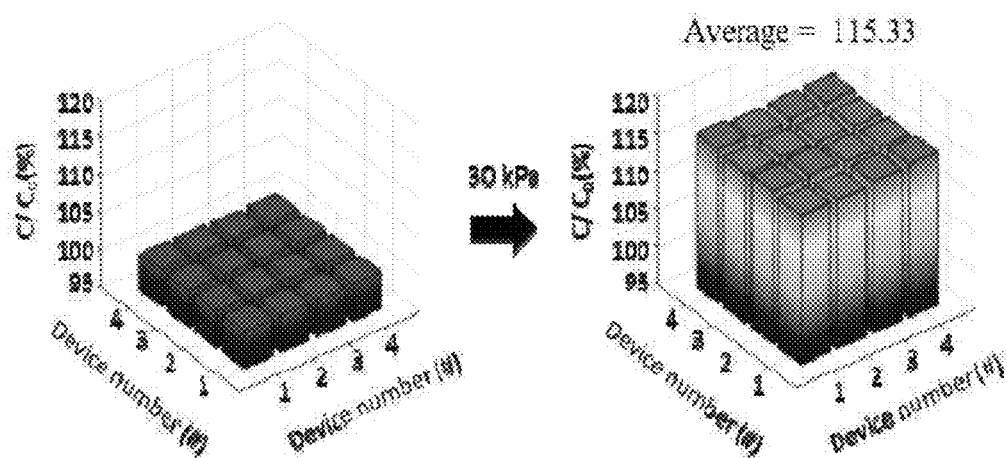
FIG. 10B is a graph showing the uniformity of the sensor array of FIG. 10A.
Figure 10C:
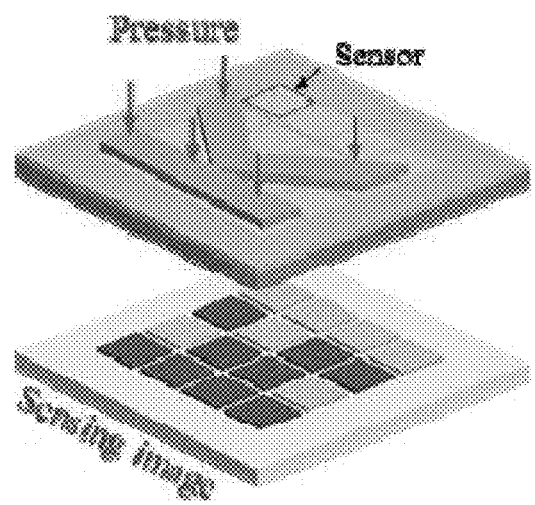
FIGS. 10C and 10D are views showing an application which performs character recognition by using the pressure sensor array according to the embodiment of the present invention.
Figure 10D:
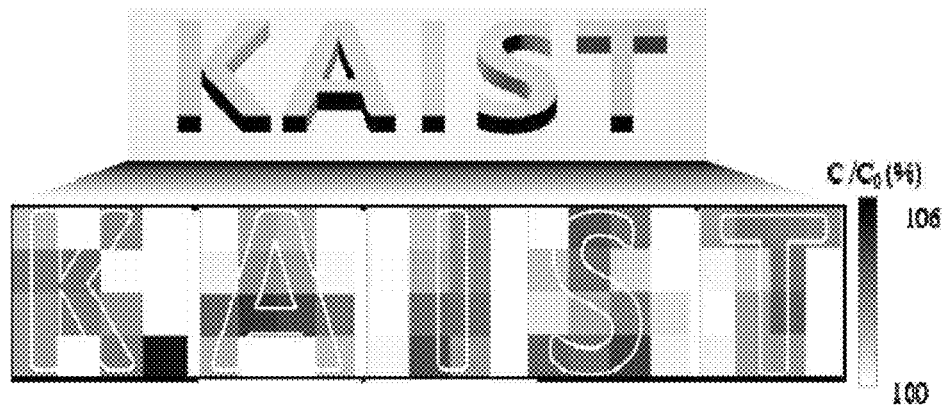

FIG. 10A is a view showing a sensor array including the pressure sensor according to the embodiment of the present invention. FIG. 10B is a graph showing the uniformity of the sensor array of FIG. 10A. FIGS. 10C and 10D are views showing an application which performs character recognition by using the pressure sensor array according to the embodiment of the present invention.

Referring to FIGS. 10A to 10D, the pressure sensor according to the embodiment of the present invention may be composed of an array and be used in a pressure touch panel. A case where the pressure touch panel is applied to the application which performs character recognition and the result of the application are shown in FIGS. 10C and 10D respectively.

Figure 11A:
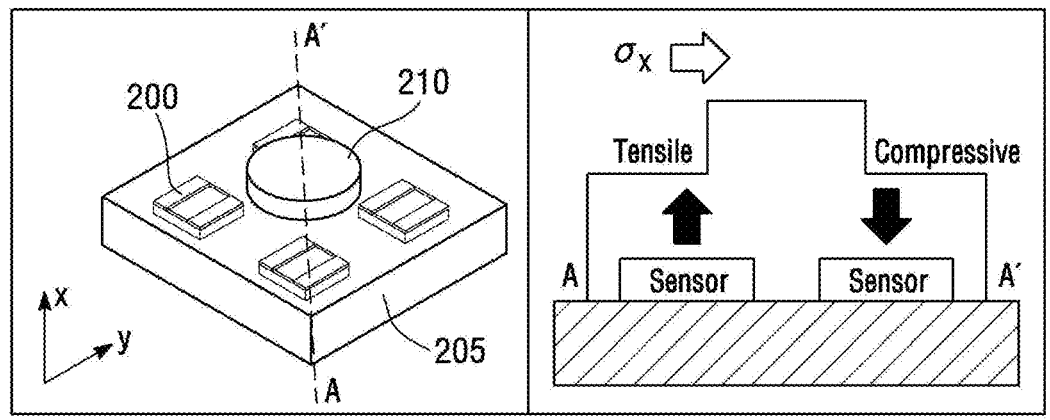
FIG. 11A shows a perspective view and a cross sectional view which schematically show a multiaxial tactile sensor using the pressure sensor according to the embodiment of the present invention.
Figure 11B:
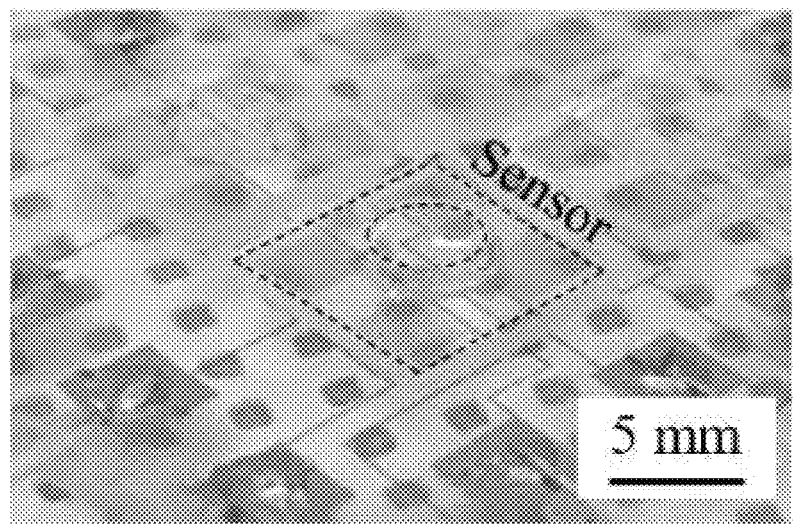
FIG. 11B is a view showing an actually implemented multiaxial tactile sensor array.
Figure 11C:
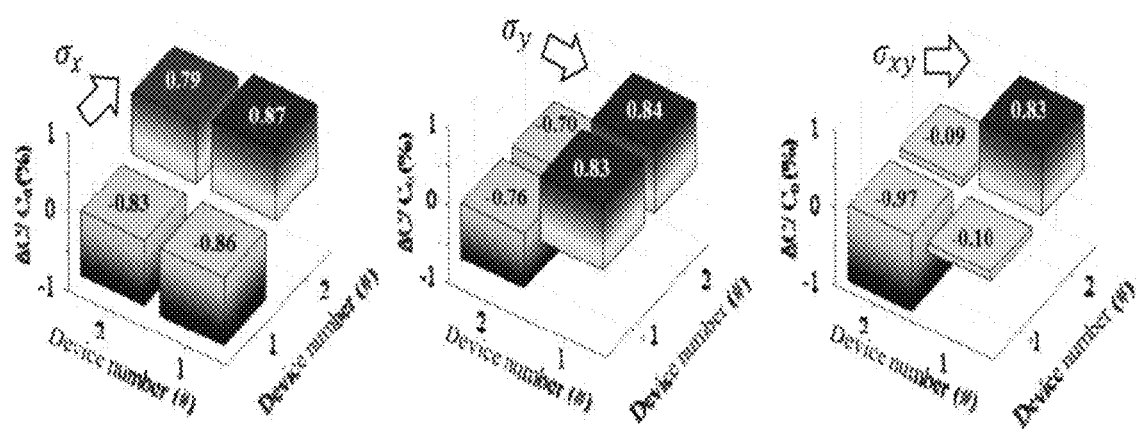
FIG. 11C is a simulation result showing the result of multiaxial pressure measurement.

FIG. 11A shows a perspective view and a cross sectional view which schematically show a multiaxial tactile sensor using the pressure sensor according to the embodiment of the present invention. FIG. 11B is a view showing an actually implemented multiaxial tactile sensor array. FIG. 11C is a simulation result showing the result of multiaxial pressure measurement.

Referring to FIGS. 11A to 11C, the pressure sensor according to the embodiment of the present invention may be composed of an array and be used in the multiaxial tactile sensor. Specifically, a plurality of the pressure sensors 200 may be included in the multiaxial tactile sensor and in particular may be arranged in four directions. FIG. 11A shows that the pressure sensors 200 are arranged in the form of an array of 2×2. However, the embodiment of the present invention is not limited thereto. The type of the arrangement may be modified and carried out within a range that can be understood by those skilled in the art to which the embodiment of the present invention belongs to.

A cover 205 which entirely covers the plurality of pressure sensors 200 may be formed and a bump structure 210 may be formed on the cover 205. The bump structure 210 contacts another object and is formed to have elasticity. This is a structure in which the bump structure 210 can be pushed in the direction in which the pressure is applied.

The cover 205 and the bump structure 210 may be formed of a transparent element or an opaque element. That is, the cover 205 and the bump structure 210 may be formed of a material having elasticity and are not limited to characteristics of the light transmittance of the element.

If the pressure is applied in the X direction, the pressure sensor 200 disposed in the X direction receives a compressive force and the pressure sensor 200 disposed in a direction reverse to the X direction receives a tensile force so that the direction of the pressure can be sensed. That is, the multiaxial tactile sensor according to the embodiment of the present invention can operate such that the compressive force is applied to the pressure sensors 200 disposed in a direction in which an external pressure is applied (e.g., X direction) and the tensile force is applied to the pressure sensors disposed in a direction reverse to the X direction (e.g., Y direction).

As shown in FIG. 11C, the multiaxial tactile sensor according to the embodiment of the present invention can distinguish and detect (i) a case where the external pressure is applied in the X direction, (ii) a case where the external pressure is applied in the Y direction, and (iii) a case where the external pressure is applied in the XY direction. The direction in which each red gradually becomes darker means the direction in which the external pressure is applied.

While the embodiment of the present invention has been described with reference to the accompanying drawings, it can be understood by those skilled in the art that the present invention can be embodied in other specific forms without departing from its spirit or essential characteristics. Therefore, the foregoing embodiments and advantages are merely exemplary and are not to be construed as limiting the present invention.

What is claimed is:

1. A pressure sensor comprising laterally arranged electrodes on a coplanar surface, the pressure sensor comprising:
   a substrate whose top surface is formed in the form of a plurality of projections;
   a first electrode which is formed on one side of the top surface of the substrate;
   a second electrode which is formed on the other side of the top surface of the substrate and is spaced apart from the first electrode; and
   a dielectric material layer which is formed on the top surface of the substrate, fills a space between the first electrode and the second electrode, and includes a nanoparticle,
   wherein a pressure applied in a direction perpendicular to the top surface of the substrate causes an increase in the dielectric constant of the dielectric material layer,
   wherein the magnitude of the pressure is sensed by detecting an increase in a capacitance value between the first electrode and the second electrode according to the increase in the dielectric constant.

2. The pressure sensor of claim 1, wherein the dielectric material layer is conformally formed on the top surface of the substrate.

3. The pressure sensor of claim 2, wherein the nanoparticle is a metallic material.

4. The pressure sensor of claim 1, wherein the top surface of the substrate comprises a protrusion portion and a concave portion, and wherein, when a pressure is applied, stress is increased at the corner of the protrusion portion.

5. The pressure sensor of claim 1, wherein the first electrode is formed on the substrate to extend in a first direction in which the projection shape is continuously arranged or is formed to extend in a second direction perpendicular to the first direction.

6. The pressure sensor of claim 5, wherein the second electrode is formed to extend on the substrate in the first direction or in the second direction.

7. The pressure sensor of claim 1, wherein the projection shape forms a stress concentration structure, and wherein transmittance is improved by reducing light reflection on the top surface of the substrate through the stress concentration structure.

8. A multiaxial tactile sensor comprising:
   a pressure sensor array in which a plurality of pressure sensors is arranged in the form of an array, wherein each of the plurality of pressure sensors is the pressure sensor of claim 1;
   a cover which entirely covers the pressure sensor array; and
   a bump structure which is formed on the cover.

9. The multiaxial tactile sensor of claim 8, wherein the pressure sensors of the pressure sensor array are arranged in the form of an array of 2×2.

10. The multiaxial tactile sensor of claim 8, wherein the multiaxial tactile sensor operates such that a compressive force is applied to a pressure sensor disposed in a third direction and a tensile force is applied to a pressure sensor disposed in a fourth direction reverse to the third direction.

11. The pressure sensor of claim 1, wherein the top surface of the substrate on which the dielectric material layer is formed comprises a protrusion portion and a concave portion.

* * * * *